H. H. BATES.
CONTROL MECHANISM FOR TRACTORS AND THE LIKE.
APPLICATION FILED DEC. 13, 1915.
1,229,865.
Patented June 12, 1917.
2 SHEETS—SHEET 1.
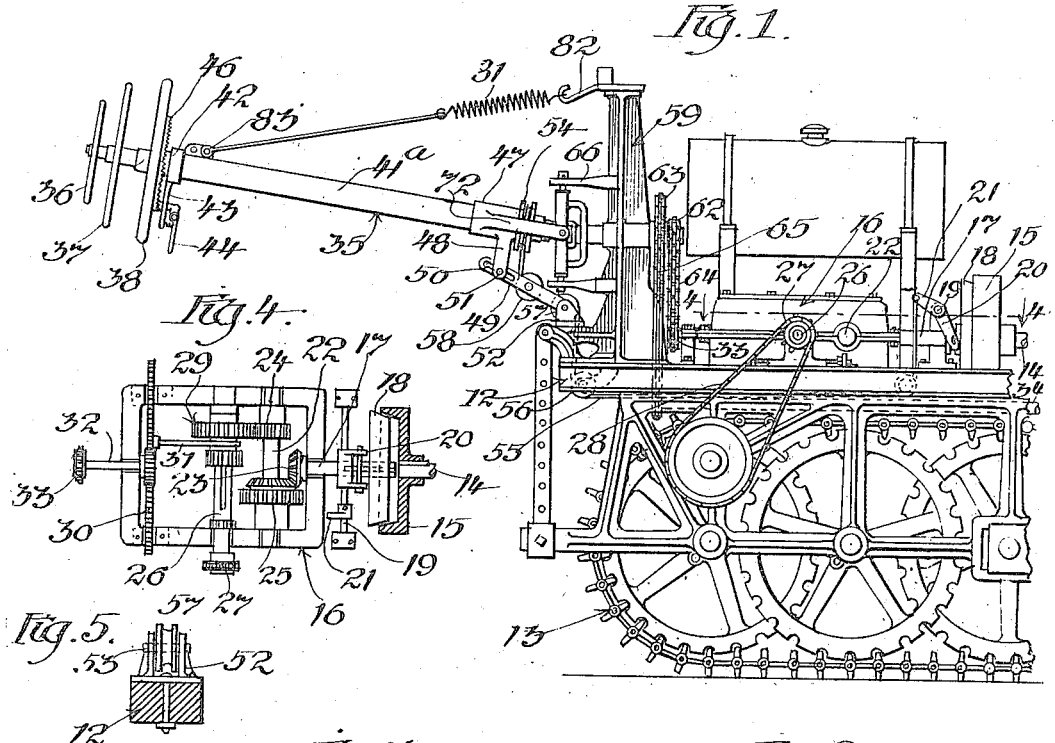
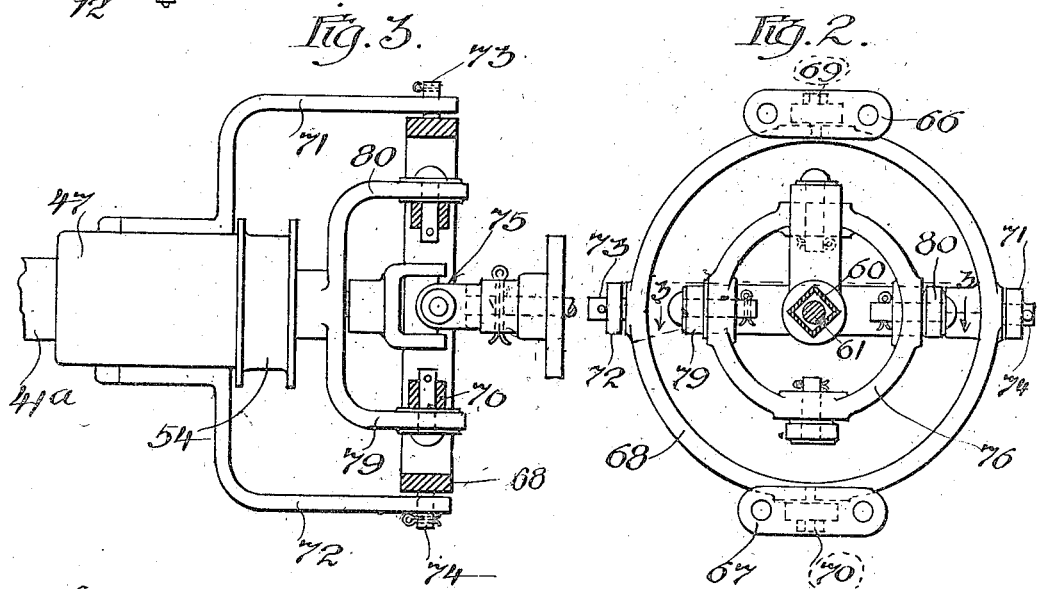
Witness
Harry S. Gaither
Inventor:
Harry H. Bates.
By Bauman & Bauman
Attorneys

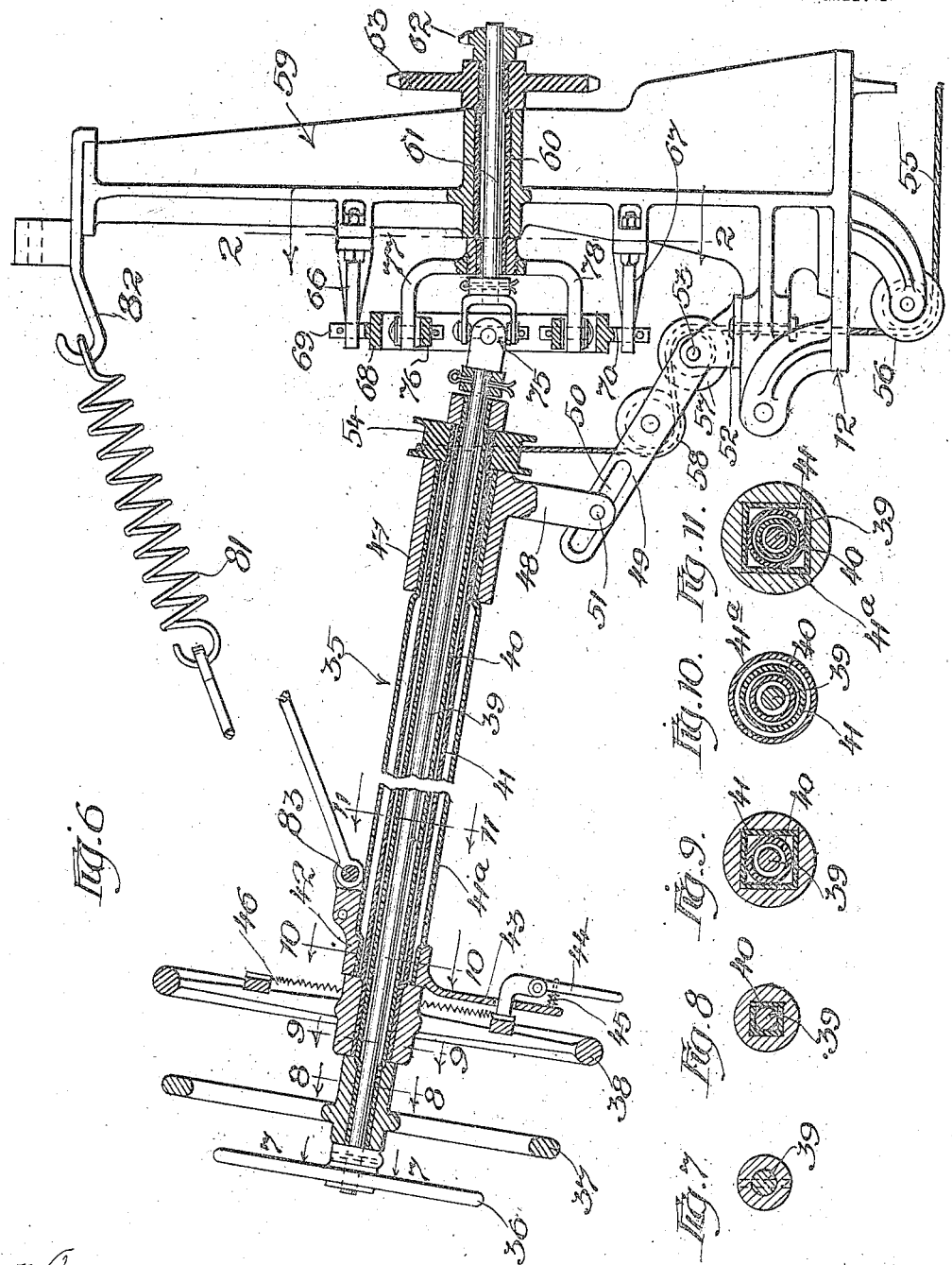

UNITED STATES PATENT OFFICE.

HARRY H. BATES, OF JOLIET, ILLINOIS, ASSIGNOR TO BATES MACHINE COMPANY, OF JOLIET, ILLINOIS, A CORPORATION OF ILLINOIS.

CONTROL MECHANISM FOR TRACTORS AND THE LIKE.

1,229,865.      Specification of Letters Patent.      Patented June 12, 1917.

Continuation in part of application Serial No. 812,506, filed January 16, 1914. This application filed December 13, 1915. Serial No. 66,520.

*To all whom it may concern:*

Be it known that I, HARRY H. BATES, a citizen of the United States, residing at Joliet, Will county, Illinois, have invented certain new and useful Improvements in Control Mechanisms for Tractors and the like, of which the following is a specification.

The present invention has to do with improvements in mechanisms for controlling tractors and the like, although it will appear from a study of the constructions herein disclosed, that they may be applied with great advantage to other devices than tractors.

It is very desirable to be able to control tractors for use in the hauling of farm implements and machinery from a position at the rear of said tractors, so that the operator may properly control the tractor, while at the same time maintaining his position on the trailing implement. This is particularly desirable in the case of such implements as harrow eveners, seeding machines, and the like, which implements themselves have certain levers and other control mechanisms. By so constructing the tractor that its various functions may be controlled from the rear, it is possible to bring these functions, as well as the control of the implement itself, directly into the hands of a single operator.

One of the objects of the invention is to provide a construction of control mechanism which is itself peculiarly adapted for such mounting on the tractor that it will project from the rear end thereof a suitable distance for convenient manipulation by the operator. Another object in this connection is to so form the control mechanism that it may be conveniently swung from side to side or raised and lowered with respect to the tractor frame. This will enable the operator, sitting or standing on the trailing implement, to retain the control wheels or the like within his grasp, and at a given position with respect to the trailing implement, while the tractor itself turns in one direction or the other with respect to the trailing implement. Still another object in this connection is to provide a construction of mounting which will very firmly support the various control wheels, while at the same time permitting them to be adjusted back and forth, or up and down, with great facility.

Other objects and uses will appear from a detailed description of the invention which consists in the features of construction and combinations of parts hereinafter described and claimed.

Referring to the drawings:

Figure 1 shows a fragmentary elevation of the rear portion of a tractor having applied thereto one embodiment of the features of the present invention;

Fig. 2 shows an enlarged detail section taken on the line 2—2 of Fig. 6, looking in the direction of the arrows;

Fig. 3 shows a horizontal section taken on the line 3—3 of Fig. 2, looking in the direction of the arrows;

Fig. 4 shows a horizontal section through the change speed box and clutch illustrated in elevation of Fig. 1, being taken substantially on the line 4—4 of Fig. 1, looking in the direction of the arrows;

Fig. 5 shows a detail elevation of the pintle over which the clutch cable passes;

Fig. 6 shows an enlarged longitudinal section through the control devices;

Fig. 7 shows a section taken on the line 7—7 of Fig. 6, looking in the direction of the arrows;

Fig. 8 shows an enlarged section taken on the line 8—8 of Fig. 6, looking in the direction of the arrows;

Fig. 9 shows an enlarged section taken on the line 9—9 of Fig. 6, looking in the direction of the arrows;

Fig. 10 shows an enlarged section taken on the line 10—10 of Fig. 6, looking in the direction of the arrows; and Fig. 11 shows an enlarged section taken on the line 11—11 of Fig. 6, looking in the direction of the arrows:

This application is a division of my application for Letters Patent of the United States on improvements in tractors, Serial No. 812,506, which was filed January 16, 1914. Certain of the features of invention disclosed in the present case are also disclosed in the aforesaid previously filed application. However, in the particular construction shown in the drawings in this application, there are also incorporated certain other features not shown in the aforesaid previously filed application.

Referring now to the several figures, the rear portion of the tractor frame is designated by the numeral 12. The tractor frame carries a suitable prime mover and steering wheels, the prime mover being drivingly connected to a suitable driving means 13. In the construction illustrated, this driving means takes the form of a caterpillar, although it will be understood that, as far as the features of the present invention are concerned, any other suitable driving means might be substituted.

The engine is connected to the driving means through a suitable form of clutch and change speed mechanism, which clutch and change speed mechanism may be controlled by the controlling device to be presently described. In the particular arrangement illustrated, the engine shaft 14 carries a fly wheel 15 having on its back face a conical recess. Behind the fly wheel is a control box 16, into which enters the driving shaft 17. On one end of said driving shaft, there is splined a friction block 18 which may be forced forward into engagement with the conical recess of the fly wheel. As a convenient means for accomplishing this result, I have illustrated a rock shaft 19 suitably journaled in the frame, said rock shaft having a fork 20 operatively connected to the friction block 18, so that, upon rocking the shaft 19, the friction block will be driven into the recess of the fly wheel, whereupon said block and the shaft 17 will be driven by the engine. A bell crank 21 serves as a means for rocking the shaft 19.

Within the box 16, there is mounted a jack shaft 22, said jack shaft being geared to the shaft 17 by the beveled gears 23. On one end, the jack shaft carries a pinion 24, and on its other end, it carries a pinion 25. Adjacent to the jack shaft is a sprocket shaft 26, the protruding end of which carries a sprocket 27 which is connected to the caterpillar by a suitable chain 28. A double gear 29 is splined to the sprocket shaft, so that, when said gear stands in the position illustrated in Fig. 4, the sprocket shaft will be driven from the pinion 24, and whereas, when the double gear 29 is shifted over, it will be driven by the gear 25. In this way, the speed ratio existing between the engine shaft and the sprocket shaft can be changed.

For the purpose of shifting the double gear 29, I have illustrated a ratchet 30 as being slidably mounted within the change speed box, said ratchet having a fork 31 which moves the double gear back and forth. A short shaft 32 is geared to the ratchet, the protruding end of said shaft having a sprocket 33 by which it may be rotated.

Extending longitudinally through the frame of the tractor, is a steering shaft 34, the forward end of which is suitably connected to the steering wheels.

Carried by the rear portion of the tractor is the control device 35. The same is provided with a wheel 36 for controlling the change speed box, a wheel 37 for controlling the steering device, and a wheel 38 for operating the clutch. The control device is conveniently formed as an elongated arm having its forward end pivotally connected to the tractor frame in such way that it can be raised and lowered or swung from side to side, in order to bring the wheels 36, 37, and 38 into convenient reach of the operator.

Referring particularly to Fig. 6, the elongated arm is seen to consist of a series of concentric tubes and rods. The wheel 36 is secured to a central rod 39, the wheel 37 is secured to a tube 40, and the wheel 38 is secured to a tube 41. The central portions of these tubes are conveniently of circular form, whereas their end portions are conveniently squared so as to effect the necessary driving connection. An outer tube 41ᵃ serves as a support for the remaining mechanisms, and at its outer end, it also carries a sleeve 42. On this sleeve is an arm 43 which carries the pawl 44, which pawl is normally thrown in locking position by the spring 45. On the front face of the wheel 38 is a circular ratchet 46 which will be engaged by the pawl 44 so as to lock the wheel 38 in the desired position.

The inner end of the tube 41 carries another sleeve 47 which has a downwardly depending lug 48. A bar 49 has its forward end provided with a slot 50, within which slot works a pin 51 carried by a lug 48. A pintle 52 is pivotally mounted on the rear portion of the tractor frame, and the forward end of the bar 49 is pivoted to said pintle at the point 53. Therefore, as the control arm is raised or lowered, or swung from side to side, the bar 49 will follow such movements.

On the forward end of the tube 41 is a drum 54 which will be rotated by the rotation of the wheel 38. Connected to the free end of the lever arm 21 on the shaft 19 is a cord or the like 55. Said cord passes over suitable pulleys, including a stationary pulley 56, and is connected to the drum, so that the rotation thereof will pull upon said cord and thus rock the shaft 19 so as to carry the block 18 into frictional engagement with the recess of the engine fly wheel. The driving connection will thus be established. In order to secure proper operation of the cord 55 for the various positions into which the control arm may be swung, I prefer to pass said cord over the pulley 57 mounted in the pintle, and the pulley 58 carried by the bar 49. The cord recesses of the pulleys 56 and 57 are in substantially vertical alinement, so that the swinging of the pulley 57 about the vertical pivotal axis of the pintle will nevertheless permit the cord to properly work over said pulleys.

Carried by a suitable standard 59 are a sleeve 60 and a rod 61 therein. The rod carries a sprocket 62, and the sleeve a sprocket 63. The sprocket 62 is connected by a chain 64 to the sprocket 33 of the change speed box, whereas the sprocket 63 is connected to a sprocket on the steering rod 34 by means of a chain 65. On the back side of the standard 59 are the upper and lower brackets 66 and 67, respectively. The ring 68 is pivoted to said brackets at the points 69 and 70 respectively, so that said ring can oscillate about a vertical axis. The sleeve 47 has the arms 71 and 72, which are pivoted to the side portions of the ring at the points 73 and 74 respectively, so that the control device can be swung about a horizontal axis between the points 73 and 74. It thus appears that, as the control device is swung about the vertical axis, or raised and lowered about the horizontal axis, its forward end will nevertheless be properly supported.

The rod 39 is connected to the rod 61 by a universal joint 75. A ring 76 is connected to the sleeve 60 by brackets 77 and 78, and said ring is also connected to the sleeve 40 by means of brackets 79 and 80, said latter brackets being at right angles to the brackets 77 and 78. Therefore, the ring 76 and associated connections constitute, in effect, a universal joint between the sleeves 40 and 60. This universal joint lies in the same vertical plane with the universal joint 75, so that both of said universal joints will function properly, no matter into which position the control arm may be swung.

The outer end of the control arm will tend to fall under the influence of gravity. It may be supported in any suitable way, or the operator himself may carry the weight thereof. However, as a convenient means of flexibly supporting said outer end, I have illustrated a spring 81 having its inner end hooked into a hook 82 on the upper end of the standard 59, and having its outer end connected to the sleeve 42 at the point 83. At any time it is desired to disconnect the control arm, this may be conveniently done by disconnecting the universal joints and the ring 68, and by unhooking the spring or the hook 82.

It will be understood that certain of the features herein disclosed are also disclosed in my previously filed application for Letters Patent of the United States, for improvements in tractors, Serial No. 812,506, filed January 16, 1914. In this application there are also disclosed certain features not disclosed in my aforesaid filed application. Nevertheless, as to all the subject matter common to the two cases, I claim the benefits and advantages to which I am entitled by reason of such earlier filing date.

While I have herein shown and described but a single form of construction embodying the features of invention herein disclosed, still it will be understood that I am not limited to such particular construction, except as I may limit myself by the claims, but I include within the scope of my invention all equivalent constructions operating in equivalent manners to produce equivalent results.

I claim:

1. In an apparatus of the class described, the combination with a suitable frame, of a ring pivoted to said frame and adapted to swing about a vertical axis, a supporting member having its inner end pivoted to said ring and adapted to swing about a horizontal axis intersecting said vertical axis, a spring for sustaining the outer end of the supporting member, a tube rotatably mounted within said supporting member, a hand wheel connected to the outer end of said rotatably mounted tube, means for locking said hand wheel in any desired position, a drum connected to the inner end of said rotatably mounted tube, a pintle beneath the aforementioned ring, a bar having one end pivoted to said pintle and its outer end slidably connected to the supporting member, a pulley on said bar adapted to transmit a rope or the like from the pintle to the drum, a tube rotatably mounted within the first mentioned rotatably mounted tube, a hand wheel connected to the outer end of said second mentioned rotatably mounted tube, a universal joint connected to the inner end of said tube, a rod extending through the second mentioned rotatably mounted tube, a hand wheel on the outer end of said rod, and a universal joint connected to the inner end of said rod, both of said universal joints working on the point of intersection of the horizontal and vertical axes of the first mentioned ring, substantially as described.

2. In an apparatus of the class described, the combination with a suitable frame, of a supporting member, means for connecting the inner end of said member to said frame to permit the member to swing about a horizontal axis and about a vertical axis, both of said axes intersecting each other, a pair of rotatable tubes concentrically mounted within said supporting member and extending throughout the length of the same, a hand wheel mounted on the outer end of one of said tubes, means for locking said hand wheel in desired position, a drum on the inner end of said tube, a pintle mounted beneath the point of intersection of the horizontal and vertical axes about which the supporting tube may swing, means for transmitting a rope or the like from said drum to said pintle, a hand wheel connected to the outer end of the other rotatable tube, a universal joint connected to the inner end of said tube, a rod concentrically mounted with respect to all of said tubes, a hand wheel on the outer end of said rod, and a universal joint connected to the inner end of said rod, both of said universal joints working substantially on the point of intersection of the first mentioned horizontal and vertical axes, substantially as described.

3. In an apparatus of the class described, the combination with a suitable frame, of a supporting member, means for connecting the inner end of the same to the frame to permit said member to swing about either a horizontal or a vertical axis, the horizontal and vertical axes intersecting each other, a pair of tubes concentrically and rotatably mounted within the supporting member and extending throughout the length of the same, hand wheels secured to the outer ends of said rotatable tubes, a drum connected to the inner end of one of said tubes, means for transmitting a rope from said drum to a desired point on the frame, a universal joint connected to the inner end of the other of said tubes, a rod concentrically and rotatably mounted within said tubes and extending throughout the length of the same, a hand wheel connected to the outer end of said rod, and a universal joint connected to the inner end of said rod, both of the aforementioned universal joints working substantially on the point of intersection of the horizontal and vertical axes, substantially as described.

4. In an apparatus of the class described, the combination with a suitable frame, of a supporting member, means for connecting the inner end of said member to the frame to permit said member to swing about a horizontal and a vertical axis, both of said axes intersecting each other, a plurality of rotatable members concentrically mounted within said supporting member, suitable hand wheels or the like connected to the outer ends of said members, and universal joints connected to the inner ends of said members, said universal joints working substantially on the point of intersection of the aforementioned horizontal and vertical axes, substantially as described.

5. In an apparatus of the class described, the combination with a suitable frame, of an elongated supporting member, means for connecting the inner end of said supporting member to the frame to permit the supporting member to swing about a horizontal and about a vertical axis, a plurality of members rotatably and concentrically mounted within said supporting member, suitable hand wheels or the like connected to the outer ends of said members, and universal joints connected to the inner ends of said members, said universal joints working substantially on the point of intersection of the aforementioned horizontal and vertical axes, substantially as described.

6. In an apparatus of the class described, the combination with a suitable frame, of an elongated supporting member, means for connecting the inner end of said supporting member to the frame to permit said supporting member to swing about two axes intersecting each other, a plurality of members rotatably and concentrically mounted within the supporting member, suitable hand wheels or the like connected to the outer ends of said members, and universal joints connected to the inner ends of said members, said universal joints working substantially on the point of intersection of the aforementioned axes, substantially as described.

7. In an apparatus of the class described, the combination with a suitable frame, of an elongated supporting member, means for connecting the inner end of said supporting member to the frame to permit the supporting member to swing in a desired direction with respect to the frame, a plurality of control members rotatably mounted with respect to the supporting member, suitable hand wheels or the like on said control members, and universal joints connected to the inner ends of said control members, said universal joints permitting movement of the supporting member and the control members in unison in the desired direction, substantially as described.

8. In an apparatus of the class described, the combination with a suitable frame of an elongated supporting member, means for connecting the inner end of said supporting member to the frame to permit the supporting member to move in a desired direction with respect to the frame, a control member movably mounted with respect to the supporting member, a hand wheel or the like on said control member, and a universal joint on the inner end of the control member to permit movement of the supporting member and the control member simultaneously with respect to the frame, substantially as described.

9. In an apparatus of the class described, the combination with a suitable frame, of an elongated supporting member, means for connecting the inner end of said supporting member to the frame to permit movement of the supporting member in a desired direction with respect to the frame, a controlling device adjacent to the supporting member, a controlling member movably mounted with respect to the supporting member and in connection with the controlling device, and a flexible connection in the controlling member permitting movement of the supporting member and the controlling member simultaneously in the desired direction, substantially as described.

10. In an apparatus of the class described, the combination with a suitable frame, of an elongated supporting member, means for connecting the inner end of the supporting member to the frame to permit the supporting member to move in a desired direction with respect to the frame, a controlling member movably mounted with respect to the supporting member, and a flexible connection in the controlling member permitting movement of the controlling member and the supporting member simultaneously in the desired direction, substantially as described.

HARRY H. BATES.

Witnesses:
THOMAS A. BANNING, Jr.,
JOHN A. BODE.